United States Patent [19]

Kolodesh et al.

[11] Patent Number: 4,981,220
[45] Date of Patent: Jan. 1, 1991

[54] METHOD OF AND APPARATUS FOR SEPARATING SEEDS FROM A JUICE/JUICE SAC SLURRY

[75] Inventors: Michael S. Kolodesh; Walter Cash, Jr., both of Cincinnati, Ohio

[73] Assignee: The Procter & Gamble Company, Cincinnati, Ohio

[21] Appl. No.: 202,735

[22] Filed: Jun. 3, 1988

[51] Int. Cl.$^5$ .............................................. B07C 9/00
[52] U.S. Cl. .................................... 209/691; 209/694; 241/283; 426/484
[58] Field of Search ................... 209/2, 691, 692, 693, 209/694, 707, 635, 696, 700; 241/283; 426/478, 484, 495; 99/514, 547

[56] References Cited

U.S. PATENT DOCUMENTS

| | | | |
|---|---|---|---|
| 549,699 | 11/1895 | Abele | 209/329 |
| 882,084 | 3/1908 | Vaudreuil | 209/693 X |
| 1,924,111 | 8/1933 | Erickson | 426/484 |
| 2,360,964 | 10/1944 | Moroni | 99/496 |
| 3,183,955 | 5/1965 | James | 99/495 |
| 3,330,410 | 7/1967 | Kirk | 209/692 |
| 3,365,281 | 1/1968 | Musschoot et al. | 23/313 |
| 3,464,550 | 9/1969 | Bieler et al. | 209/694 |
| 3,487,924 | 1/1970 | Meyer | 209/75 |
| 3,680,694 | 8/1972 | Hamann | 209/119 |
| 4,513,867 | 4/1985 | Satake | 209/44.2 |
| 4,609,110 | 9/1986 | Schulman et al. | 209/663 |

FOREIGN PATENT DOCUMENTS 356963  9/1931  United Kingdom ............... 209/696

Primary Examiner—Donald T. Hajec
Attorney, Agent, or Firm—Michael E. Hilton; John V. Gorman; Richard C. Witte

[57] ABSTRACT

A method of and apparatus for separating and removing seeds from a juice/juice sac slurry. In one embodiment of the present invention, a juice/juice sac slurry is deposited onto the upper surface of an inclined, vibrating bed. The bed includes a plurality of ridges and valleys that form channels, and a plurality of pins and dams projecting upwardly from the bed. The high frequency vibrations imparted to the bed cause the juice sacs to travel up the bed to a point where they are collected while the seeds bounce off and tumble down the bed to another point where they are collected and discarded. Also disclosed and described are apparatuses for and methods of extracting fruit meat sections from a whole fruit, and an apparatus for and method of separating sectional membranes from the fruit meat section to produce the juice/juice sac slurry.

11 Claims, 11 Drawing Sheets

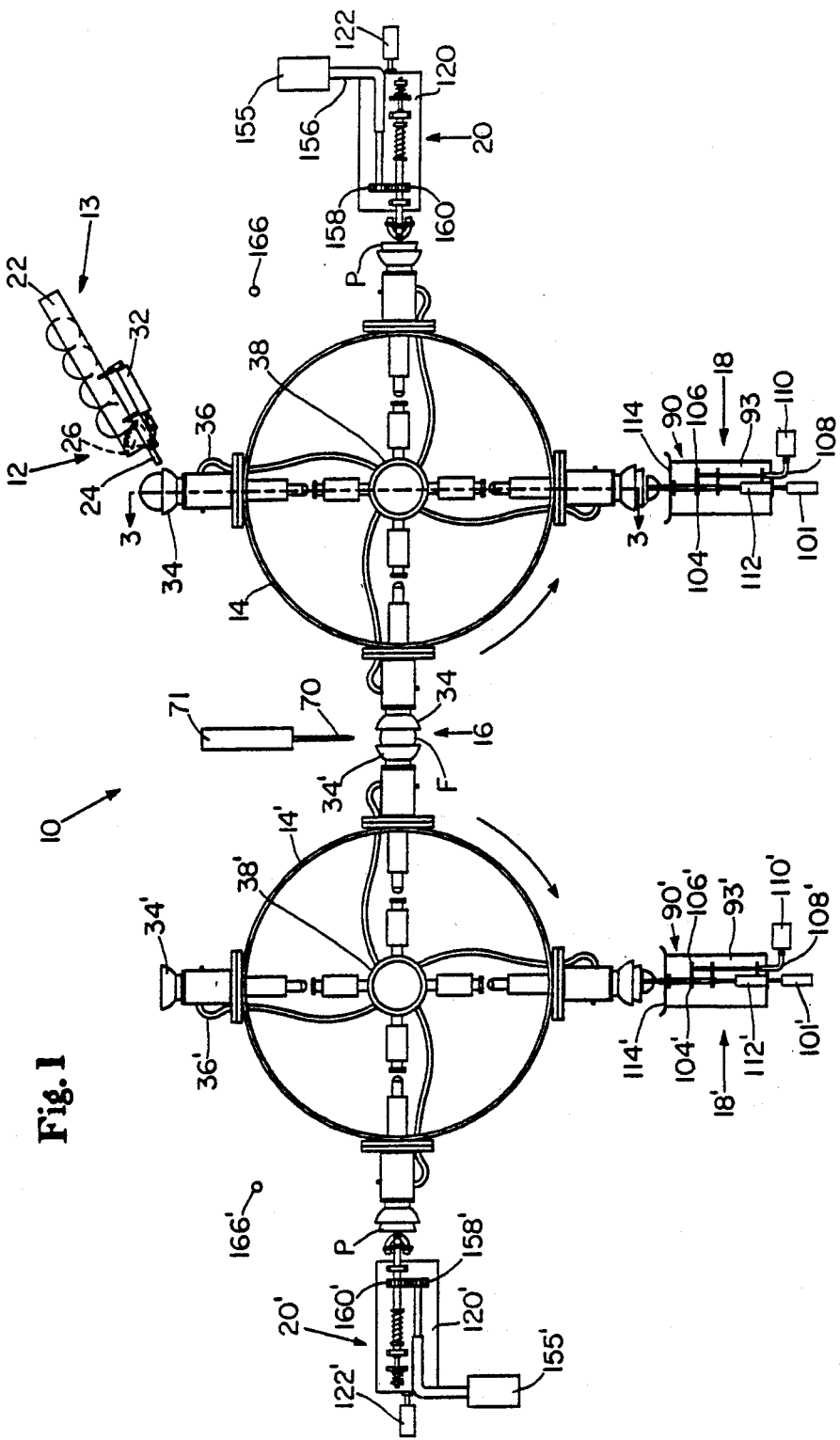

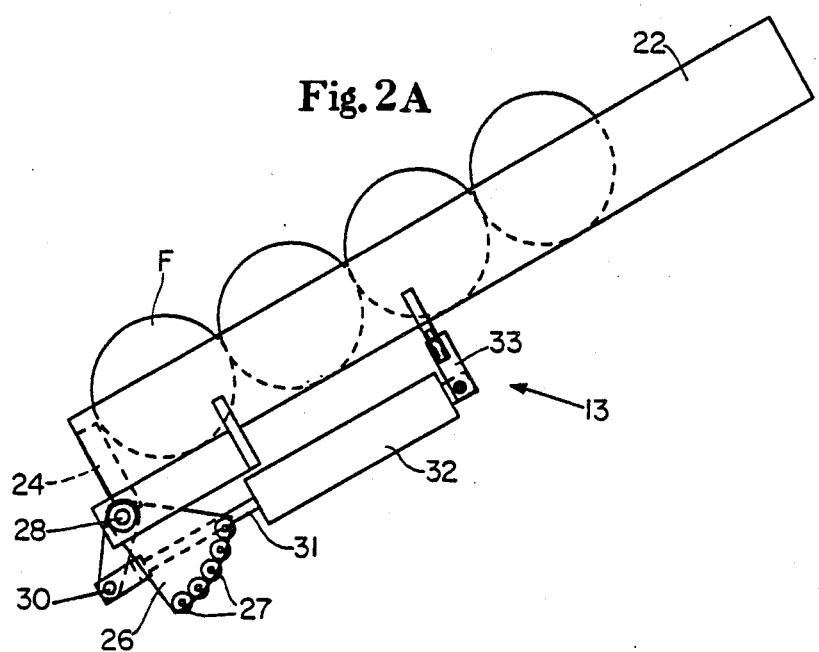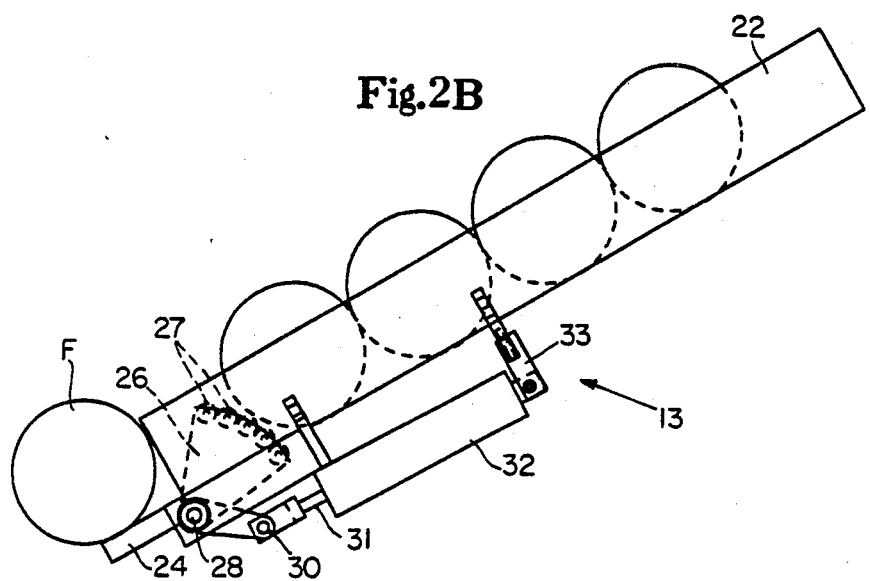

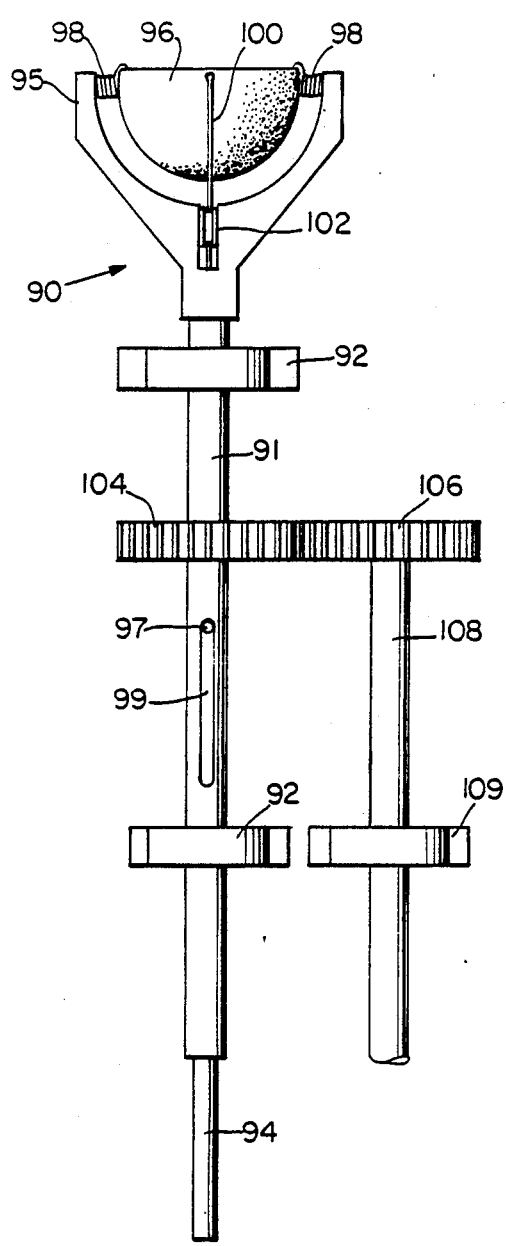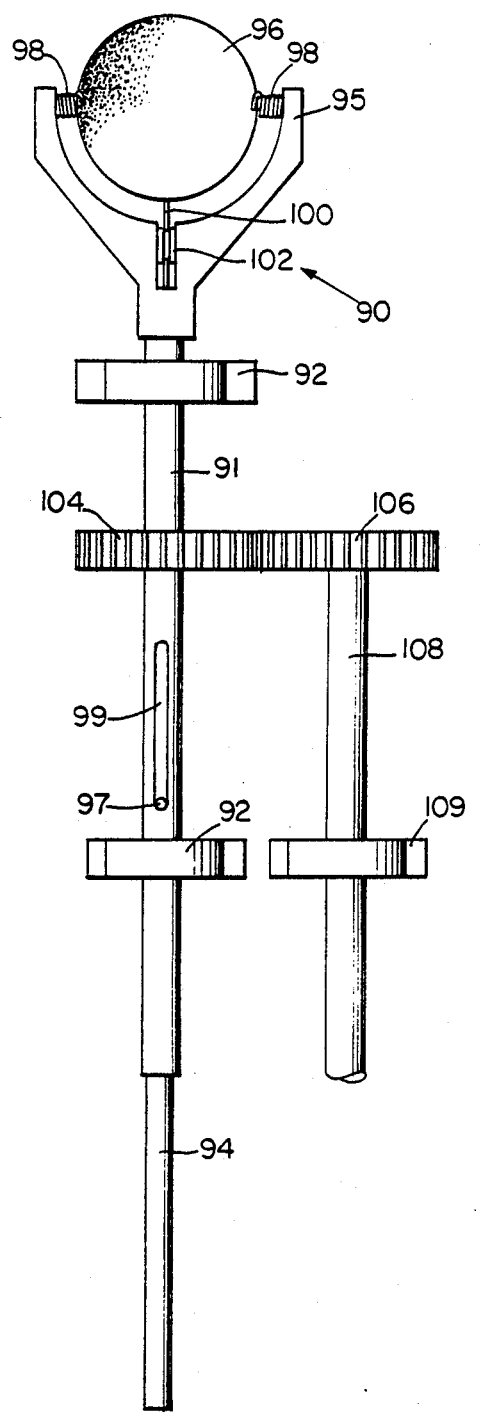

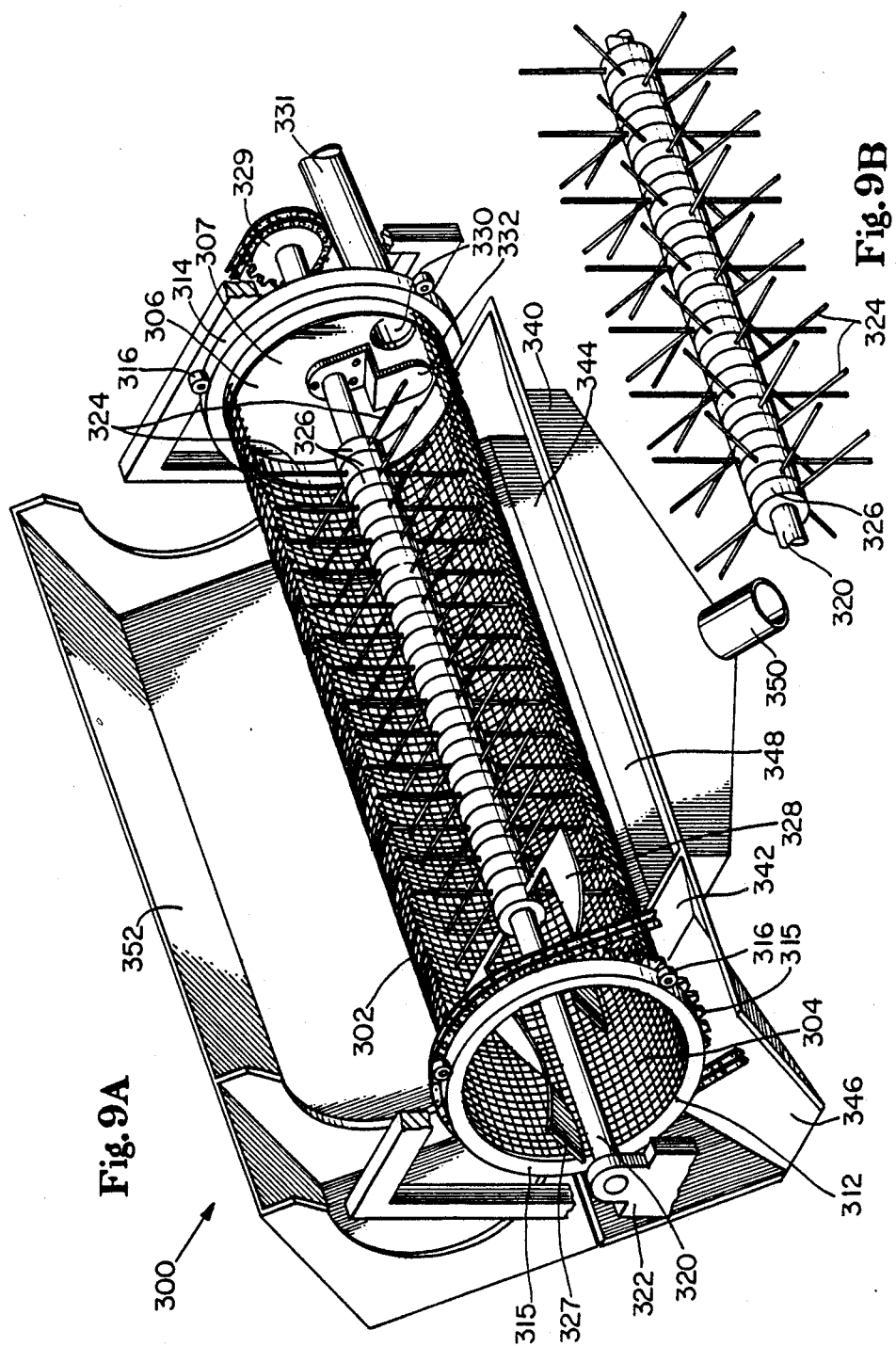

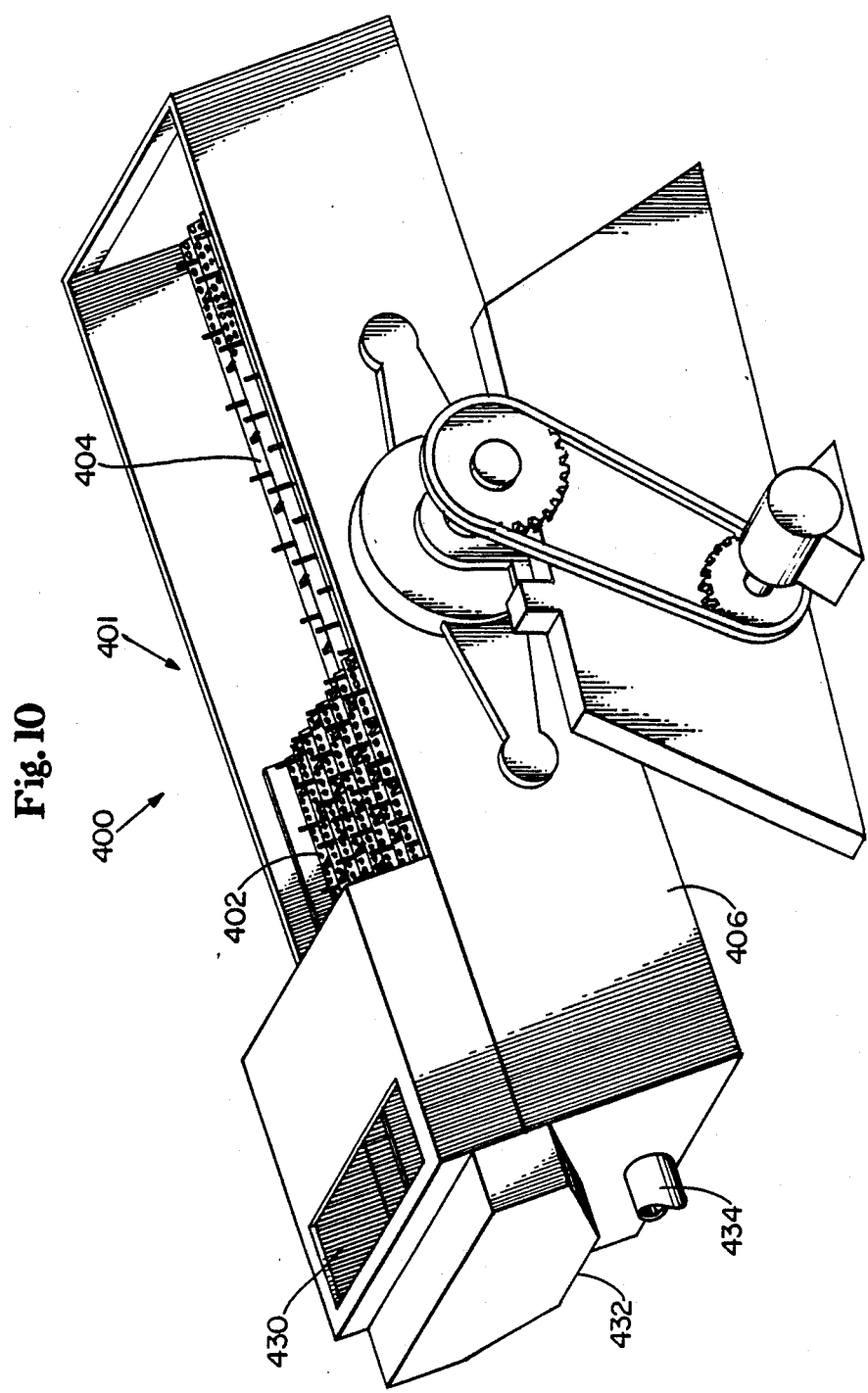

METHOD OF AND APPARATUS FOR SEPARATING SEEDS FROM A JUICE/JUICE SAC SLURRY

TECHNICAL FIELD

The present invention relates to extracting the edible components of a fruit, and more particularly to methods of and apparatuses for extracting the meat and juice from whole fruits. Even more particularly, the present invention relates to methods of and apparatuses for separating seeds from a juice/juice sac slurry obtained from fruit meat sections extracted from a whole fruit.

BACKGROUND OF THE INVENTION

Various fruit juices and beverages that contain fruit juice are very popular because of their appealing taste and also because they are perceived as being natural and nutritious. Commercially extracted and packaged fruit juices have enjoyed wide commercial success because of their convenience. However, it has been found that many consumers generally prefer the taste of hand-squeezed juice over commercially processed juice. Accordingly, a principal object of the present invention is to extract in a commercial environment the edible components of a fruit, particularly the juice and juice sacs, such that they have a taste similar to that of hand-squeezed.

Citrus fruits such as oranges, grapefruits, tangerines, lemons, and limes basically consist of an outer colored peel (flavedo), an inner white spongy peel (albedo), and the inner meat formed in wedge-shaped segments that are separated by a fibrous membrane commonly referred to as "rag." The fruit also includes a pulpy core that contains several large and small seeds. The individual meat segments primarily consist of juice sacs, which are elongated or oval-shaped sacs that contain fruit juice and are held together by an epicuticular wax. In general, the fruit's juice sacs and juice are considered to be the most desirable components for human consumption purposes. The fruit's other components, i.e., the peel, rag, and seeds, are very useful for other applications such as cattle feed.

The method used in extracting the edible components of a fruit greatly influences the final product's taste, texture, and overall quality. Generally, it has been observed that the cleaner, quicker, and more gently the fruit's juice and juice sacs are separated from the fruit's other components, the less the juice comes into contact and mixes with undesirable flavor elements, which include naringin, $\alpha$-terpineol, linalool, and d-carvone that are found in the peel; and limonin that is found in the seeds and membranes.

During hand squeezing, the consumer either intuitively or because of physical limitations presses lightly on the fruit which results in juice having less undesirable flavors than found in commercially extracted juice. This gentle pressure is difficult and not cost effective to duplicate in a mass production setting where high yields are absolutely critical. Indeed, most production machines in wide use today for extracting fruit juice can perhaps be most accurately characterized as fruit smashers. These machines essentially break the fruit into its various components and subsequently separate them by, for example, forceful screening, an example of which is the apparatus disclosed in U.S. Pat. No. 4,700,620 and leased by the FMC Corporation. During the bashing and separating steps, the fruit's components undergo much abrading and co-mingling, thus releasing and mixing the undesirable flavor elements that are found in the peel, membranes, and seeds with the juice. In addition, such rough handling essentially guarantees that none of the fragile juice sacs will survive intact.

Another type of apparatus used in the commercial juice extracting industry can be generally characterized as a reamer, examples of which are disclosed in U.S. Pat. Nos. 2,737,989 to Wurgaft and 4,479,424 to Carroll. In a basic reaming operation, the fruit is first cut in half, followed by pressing a reaming element into the exposed fruit meat to extract the juice. In general, it has been found that this type of extraction method produces low quality juice because the reaming element also squeezes the peel, membranes, and seeds, thereby releasing the undesirable flavor components found in each. In addition, in the case of a citrus fruit, the sectional membranes tend to fold over on top of one another when the reamer is forced into the fruit half, thereby making it extremely difficult to extract the fruit meat and juice deep within the fruit half. Indeed, because of the critical need for high yields in a commercial operation, most extractors find it necessary to press the reaming element very hard into the fruit which further aggravates the problem.

Another type of fruit extraction method and apparatus is generally referred to as a peeler, an example of which is disclosed in U.S Pat. No. 3,700,017 to Vincent et al. In such a system, an oriented fruit is placed between two spikes that are sharply shoved into the stem ends of the peel. The spikes and attached fruit are then rotated while two knives move laterally across the rotating fruit to cut the peel from the meat. Although such a system does effectively extract fruit meat from the fruit, it has been found that cutting the peel in this fashion releases a substantial amount of the undesirable flavor components found therein which contaminates the strong spike/peel connection to maintain a high peeling torque, which in turn requires the critical orienting step in order to insert the spike into the fruit's stem area where the peel thickness is greatest.

Another type of extraction system involves using various chemical baths such as alkali/phosphate or acid to dissolve the sectional membranes, examples of which include U.S. Pat. No. 4,560,572 to Watanabe and U.S. Pat. No. 4,139,651 to Sekiguchi. However, it is believed that such systems would be extremely unattractive in a commercial environment because of the high costs associated with the necessary chemicals. In addition, it is believed that the chemicals used in such processes would have a major adverse effect on the fruit juice's taste.

Still another extraction technique involves using high pressure fluid jets, examples of which include U.S. Pat. Nos. 1,982,741 to Keenan, 4,294,861 to Ifuku et al., and 4,300,448 to Hayashi et al. Generally, this type of system includes the critical steps of orienting the fruit relative to its stem and cutting the fruit in half perpendicular to the stem, followed by placing the exposed fruit meat in front of a fluid jet nozzle. High pressure fluid emitted from the nozzle blasts the juice and fruit meat from the peel. However, it has been found that this type of extracting system is commercially unattractive because of the large volume of pressurized fluid required to extract a commercially acceptable yield. In addition, as with reaming, the sectional membranes tend to fold over and impede the emitted fluid's ability to remove the meat deepest within the peel.

With virtually all methods and apparatuses used to extract juice and fruit meat from a fruit, a certain percentage of the fruit's seeds are also extracted that must be removed. One common apparatus used for removing seeds is a liquid cyclone or hydroclone that relies on differences in densities to separate materials. In operation, juice containing seeds tangentially enters an inverted cone at a very high speed and forms a vortex. The centrifugal force of the vortex throws denser materials out near the cone's inner surface. These dense materials, which are mostly seeds, become concentrated near the cone's pointed bottom section and are removed as underflow. Lighter materials rise inside the cone and are removed as overflow. However, it has been observed that many seeds have densities very similar to juice sacs and therefore cannot be separated by using this method.

In light of the above, the principal object of the present invention is to separate and remove seeds found in a slurry comprised of juice and unruptured juice sacs while rupturing a minimal amount of the juice sacs.

Another principal object of the present invention is to extract fruit meat from a fruit without rupturing a substantial portion of the fragile juice sacs.

Another principal object of the present invention is to extract fruit meat and juice from a fruit without extracting undesirable flavor elements from the peel, membranes, and seeds.

Yet another object of the present invention is to achieve high juice yields in a commercial environment.

Another object of the present invention is to extract large pieces of fruit meat from a fruit that can be subsequently separated into unruptured juice sacs and juice.

Another object of the present invention is to extract a very substantial portion of the fruit meat and juice from a whole fruit while exerting little pressure on the fruit's peel.

A further object of the present invention is to separate a substantial amount of unruptured juice sacs from the sectional membranes or rag of a large chunk of fruit meat that was extracted from a fruit.

SUMMARY OF THE INVENTION

In a particularly preferred embodiment of the present invention, a large quantity of whole fruits are preferably first separated into groups according to size. Next, the fruits are cleaned by using any one of several approved methods and apparatuses well known to those skilled in the art of fruit processing. The sized and cleaned fruits are then sent down a chute to a loading station where the fruits are placed into an extraction apparatus that removes the fruits' inner meat section.

In one preferred embodiment of the present invention, two counter-rotating turrets define a four-station extraction apparatus. At the first station, an unoriented fruit is fed into a resilient cup that is preferably connected to a vacuum source which aids in holding the fruit in place. The turrets are then rotated 90° to a cutting station where the corresponding resilient cup on the opposite turret also grasps the orange. A spring-loaded centering mechanism centers the two cups and grasped fruit relative to a severing knife that cuts the fruit into two substantially equal halves. The two turrets are then rotated another 90° such that each cup containing a half fruit faces a coring station. The coring station includes a rotating, ladel-shaped coring element having a cutting bowl. While rotating, the cutting bowl is rotated 90° such that its sharp peripheral edge cleanly severs a hemispherical chunk of fruit meat from the peel. The severed meat chunk tumbles out of the peel and is collected along with any released juice for subsequent processing.

After the fruit halves are cored, the turrets are indexed 90° to a reaming station where a rotating, expandable reaming element is gently pressed into the now substantially hollow fruit peel. This gentle mechanical reaming removes most of the juice and juice sacs remaining within the fruit peel. Of particular significance is that since the vast majority of the meat and internal membranes were removed during the coring operation, the reaming element is able to reach the innermost juice sacs without interference from the internal sectional membranes. Indeed, the present invention contemplates using a high pressure fluid jet to scour the peels since coring effectively eliminates the membrane interference problem.

After the peels have been gently reamed with the expandable reamer or scoured with a fluid jet, the turrets are indexed a final 90° to return the cups back to their loading position to receive another fruit. While moving between the reaming station and the loading station, the cups pass by a knock-off bar that is positioned such that the cup will clear while the empty peel will not, and consequently the peel is stripped from the cup. In addition, the vacuum supplied to the cups can be momentarily discontinued or replaced with pressurized air which makes it much easier for the bar to knock the peel from the cup.

In another particularly preferred embodiment of the present invention, the extraction apparatus is provided with cups that continuously rotate the fruit halves. At the coring station, a ring-shaped coring blade is pressed into the exposed fruit meat and rotated 90° such that the blade cleanly severs a hemispherical chunk of fruit meat from the peel. The remaining meat is removed from the peel in a reaming or fluid jet operation very similar to the one previously described.

The hemispherical fruit chunks extracted from the fruit by utilizing either one of the above apparatuses are fed into a rag separator apparatus that includes a slightly-inclined, rotating screen drum and counter-rotating shaft coaxial with the drum. The shaft includes a plurality of striker bars projecting therefrom. As the hemispherical orange chunks are fed into and tumble down through the rotating screen drum, the counter-rotating bars strike the tumbling fruit meat chunks, thereby mechanically separating the juice sacs from the sectional membranes and the juice sacs from one another. The stripped sectional membranes tumble down through the screen drum where they are axially discharged at the discharge end. Large seeds also are retained within the screen drum and are also axially discharged at the discharge end. The juice sacs, free juice, and some seeds fall radially through the rotating screen and are collected.

The juice sac/juice slurry collected from the rag separator is then sent to a seed separator that basically relies on the differences in resiliencies or bouncing characteristics between seeds and juice sacs to separate the seeds from the juice/juice slurry. The seed separator includes a vibrating base and an inclined perforate bed having a plurality of channels defined by ridges and valleys. The separator's bed also includes a plurality of pins and dams projecting upwardly from the bed's upper surface. In operation, the juice sac/juice slurry is deposited on the lower end of the bed's upper surface. The vibrating motion imparted to the perforate bed by the vibrating base sends the juice sacs traveling up the bed to a point where they are collected. The pins and dams gently break apart clumps of juice sacs as they travel up the bed to free any seeds found within the clumps. The seeds, which having different bouncing characteristics than the juice sacs, bounce relatively high off and tumble down the vibrating bed to a point where they are collected and discarded. The juice sacs can then be used in making a fruit food product or added to free juice.

BRIEF DESCRIPTION OF THE DRAWINGS

While the specification concludes with claims that particularly point out and distinctly claim the subject matter regarded as forming the present invention, it is believed that the invention will be better understood from the following detailed description with reference to the drawings in which:

FIG. 1 is a schematic, cross-sectional side view of an apparatus used to extract hemispherical chunks of fruit meat and juice from a whole fruit;

FIG. 2A is an enlarged schematic, cross-sectional side view of a loading apparatus used to load fruits into the extraction apparatus illustrated in FIG. 1;

FIG. 2B is an enlarged schematic, cross-sectional side view of a loading apparatus used to load fruits into the extraction apparatus illustrated in FIG. 1, shown in the process of loading a fruit.

FIG. 5A is an enlarged schematic side view of the coring element used in the coring station of the extraction apparatus illustrated in FIG. 1, shown in its retracted position;

FIG. 5B is an enlarged schematic side view of the coring element used in the coring station of the extraction apparatus illustrated in FIG. 1, shown in its coring position;

FIG. 9A is a schematic perspective view of a sectional membrane separating apparatus shown without its outer shroud.

FIG. 9B is an enlarged view of the striker bar assembly.

FIG. 10 is a schematic perspective view of a seed separating apparatus.

DETAILED DESCRIPTION OF THE INVENTION

Figure 3:
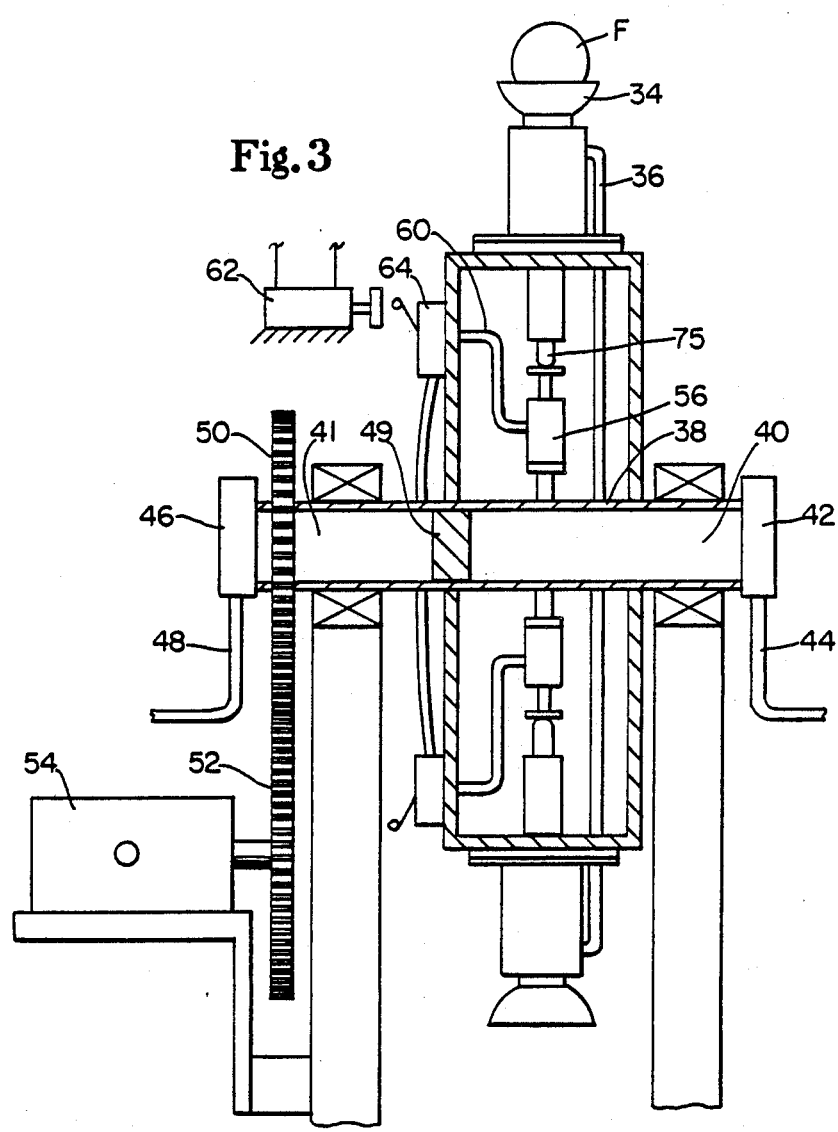
FIG. 3 is an enlarged schematic, cross-sectional view of the apparatus illustrated in FIG. 1 taken along section line 3—3.

It should be noted that although the following detailed description and illustrations are specifically directed to methods of and apparatuses for extracting meat and juice from citrus fruits such as oranges, the present invention may be applied with equal facility to extracting the interior portion of many other types of fruits and vegetables. In addition, it is to be understood that the extraction apparatuses of the present invention can be expanded to simultaneously process any number of fruits at a station, e.g., 4, 6, 12, 24, etc. However, for the sake of clarity and to avoid redundancy, the following description and illustrations show only one or two fruits being processed at any given station. Finally, the apparatuses' frame, bearings, vacuum sources, pressurized air sources, timing circuitry, means for moving the apparatuses' various components, and the like which must necessarily be provided with respect to the functional members of the disclosed apparatuses are not entirely shown in the Figures or described in detail in order to simplify and more clearly disclose the present invention, it being understood that such details are well within the knowledge of those skilled in the art of commercial fruit extraction machine design.

With reference to the drawings wherein the same numeral is used to indicate common apparatus and workpiece components, FIG. 1 is a schematic, cross-sectional side view of a four-station, dual indexing turret extraction apparatus generally indicated as 10. In FIG. 1, extraction apparatus 10 generally includes load station 12, two counter-rotating indexing turrets 14 (right turret) and 14' (left turret), cutting station 16, coring stations 18 and 18', and reaming stations 20 and 20'. As indicated by the arrows, indexing turrets 14 and 14' rotate about shafts oriented in a horizontal plane; however, it is to be understood that the present invention can be practiced with equal facility if turrets 14 and 14' rotate about shafts oriented in a vertical plane.

Loader 13 of loading station 12 provides a means for loading a fruit F onto rotating turret 14. Prior thereto, fruits F are preferably cleaned and separated into groups according to size. For example, in the case of oranges, it has been found that best results are obtained if the oranges are separated into two groups; those having a diameter of 3.0 inches (7.6 cm) or less, and those having a diameter of more than 3.0 inches (7.6 cm), the two groups being processed by separate extraction apparatuses having different sized cups, coring elements, and reaming elements as will be hereinafter explained. Fruits F can be cleaned by using any one of several generally accepted fruit cleaning methods well known in the fruit processing industry.

Referring particularly to FIGS. 2A and 2B in conjunction with FIG. 1, cleaned and sized fruits F are placed onto chute 22 of loader 13 which directs fruits F by gravity down to loading station 12. Loader 13 includes stop pin 24 and stop roller plate 26, the latter preferably having a plurality of rollers 27 along its peripheral edge. Stop pin 24 and stop plate 26 are attached to one another at approximately right angles and are pivotally mounted to chute 22 at pin 28. Linkage 30 and rod 31 connect both stop pin 24 and stop plate 26 to actuator 32 whose end portion is also attached to chute 22 with clamp 33. Actuator 32 is preferably a dual-action air cylinder that is connected to a source of pressurized air. However, as those skilled in the art will immediately recognize, actuator 32 and all other actuators to be hereinafter described can just as easily be hydraulic cylinders, solenoids, rotating cams and followers, or other equivalents thereof.

In operation, when turret 14 is in its loading position as shown in FIG. 1, a signal is sent to actuator 32 to draw rod 31 and linkage 30 inward which rotates stop pin 24 forward approximately 90° as shown in FIG. 2B and allows fruit F to roll down stop pin 24 and fall into hollow cup 34. At the same time, stop plate 26 rotates upward (shown in phantom in FIG. 2B) through a narrow slot in the bottom of chute 22 to block off the remaining fruits and momentarily prevent them from rolling down chute 22. Rollers 27 mounted along the peripheral edge of stop plate 26 allow it to slide along the fruit in contact therewith with minimal friction and without lifting the fruit up and out of chute 22. In addition, chute 22 can be provided with a hood, shroud, or overhead bar (not shown) to prevent a fruit from accidentally being ejected by the motion of stop plate 26.

After fruit F has dropped into cup 34, another signal is sent to actuator 32 to extend rod 31 and linkage 30 outward which rotates pin 24 and stop plate 26 back to their original positions. The next fruit F rolls down the chute to stop pin 24 and is now ready to be loaded into cup 34 at the start of the next cycle.

Referring to Figs. 1 and 3, cup 34 having just received fruit F has an interior surface shaped complementary to the fruit's exterior to provide a snug fit therebetween. Cups 34 and 34' are preferably made of a resilient material such as elasticized polyvinyl chloride (PVC) or Viton Fluoroelastomer so that the cup will yield and conform to the fruit's outer dimension to form a weak seal therebetween. To further aid in positively grasping fruit F, the interior cavity of cups 34 and 34' are preferably supplied with vacuum by, for example, connecting it to a vacuum source via vacuum lines 36 and 36', respectively, which are connected to hollow centershaft 38 having a vacuum side 40 in fluid communication with a vacuum source (not shown) via rotary vacuum manifold 42 and vacuum supply line 44.

Once fruit F is within cup 34, turret 14 is indexed 90°. counterclockwise as indicated by the arrow in FIG. 1 such that cup 34 and grasped fruit F stop at cutting station 16 which includes reciprocating cutting blade 70 and actuator 71. Turret 14 can be rotated in this fashion by a drive train that includes pinion gear 50, drive gear 52, and indexing motor 54 (shown in FIG. 3). Similarly, turret 14' is simultaneously indexed 90° clockwise by similar drive means until empty cup 34' also reaches cutting station 16 and is directly opposed to cup 34 holding fruit F. When in this position, cups 34 and 34' are moved toward each other such that fruit F is grasped by both cups 34 and 34' as shown in FIG. 1. Cups 34 and 34' can be moved toward each other in the following exemplary manner: a signal is sent to actuator 62 to energize and trip switch 64, which now supplies actuator 56 with pressurized air from the pressure side 41 of hollow centershaft 38 via lines 58 and 60. Actuator 56 moves shaft 75, which is connected to the base of cup 34, forward such that both cups grasp fruit F. Pressure side 41 of centershaft 38 is supplied with pressurized air from a source (not shown) via rotary pressure manifold 46 and line 48. Baffle 49 separates pressure side 41 from vacuum side 40 of centershaft 38.

Figure 4A:
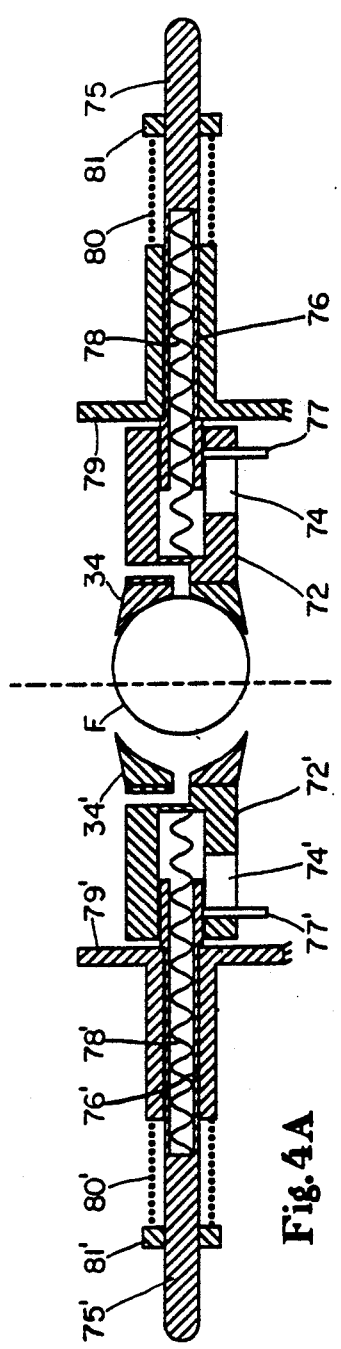
FIG. 4A is an enlarged schematic, cross-sectional side view of the centering mechanism used in the extraction apparatus illustrated in FIG. 1.
Figure 4B:
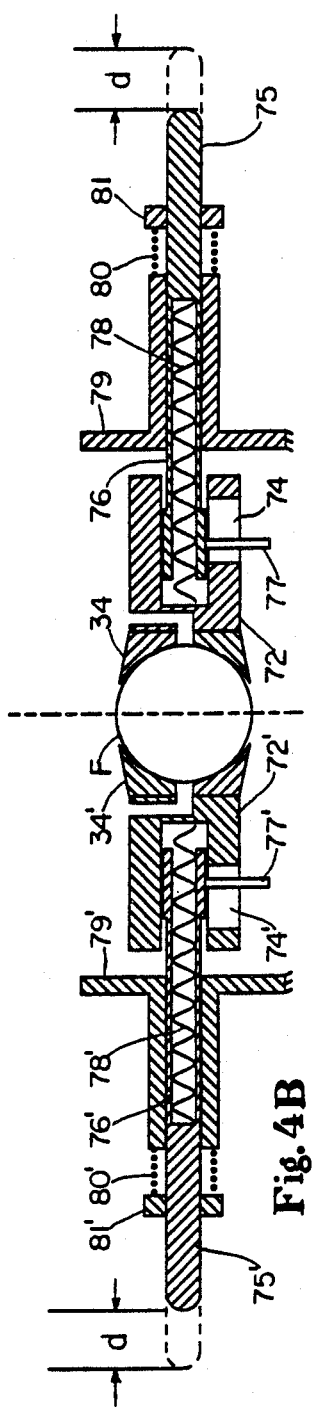
FIG. 4B is an enlarged schematic, cross-sectional side view of the centering mechanism of the apparatus illustrated in FIG. 1, shown when energized with fruit F centered.

Since most of the fruits intended to be processed by the present invention are not all the same size, moving cups 34 and 34' towards each other in the manner described above will often result in fruit F not being centered with respect to cutting blade 70. Therefore, a centering mechanism such as that illustrated in FIGS. 4A and 4B is preferably provided to center fruit F. In FIG. 4A, cup 34 (holding fruit F) and cup 34' are attached to cup holders 72 and 72', respectively, which are slidably mounted on their respective shafts 75 and 75' and secured thereto with pin 77 that rides along slot 74 cut in holder 72. Shaft 75 includes a hollow center portion 76 that contains centering spring 78. Shaft 75 is slidably journaled through bearing block 79 which is fixed to turret 14. Return spring 80 is located between bearing block 79 and collar 81 that is secured to shaft 75. In operation, when actuators 56 are energized, they move shafts 75 and 75' a fixed distance toward each other as indicated by dimension "d" in FIG. 4B. While shafts 75 and 75' move toward each other, centering springs 78 and 78' also move toward each other and push cups 34 and 34' onto opposed sides of fruit F. Since centering springs 78 and 78' have the same spring constant, the same force is exerted on opposed sides of fruit F, and consequently cups 34 and 34' seek a balanced, equilibrium position which results in fruit F being centered with respect to cutting blade 70 regardless of relatively modest variations in the size of the fruits.

Referring back to FIG. 1, cups 34 and 34' and grasped fruit F have been indexed to cutting station 16 and fruit F has been centered as described above, actuator 71 thrusts cutting blade 70 through fruit F which cuts it into two equal halves. Cutting fruit F in this fashion will release some juice from fruit F that is preferably collected.

After fruit F has been sliced in half, actuators 56 and 56' are de-energized, which allows return springs 80 and 80' to push collars 81 and 81' and attached shafts 75 and 75' back to their original positions, which also pulls cups 34 and 34' back to their original position. Cups 34 and 34' now each hold a half fruit being of substantially equal size. The dimensions of cups 34 and 34' and their resilience preferably coupled with vacuum ensure a firm grasp on half fruits F.

After fruit F has been cut in half at cutting station 17 as described above, turrets 14 and 14' are indexed another 90° such that cups 34 and 34' face coring stations 18 and 18', respectively. Referring to FIGS. 5A and 5B in conjunction with FIG. 1, coring stations 18 and 18' both include a rotatable coring element generally indicated as 90 having a hollow outer shaft 91 journaled within bearings 92, a yoke 95 attached to one end of outer shaft 91, and an inner shaft 94 that passes through hollow outer shaft 91. Stop pin 97 is attached to inner shaft 94 and slides along slot 99 in outer shaft 91. Yoke 95 carries a pivotable cutting bowl 96 between its arms on spring-loaded pins 98. Cutting bowl 96, which has a sharp outer peripheral edge, has cable 100 attached to its outer surface that passes over pulley 102 and down through hollow outer shaft 91 to where its other end is attached to inner shaft 94. Coring element 90 is mounted upon carriage 93 that can be moved towards and away from cup 34 by carriage actuator 94.

In operation, when turrets 14 and 14' have placed cups 34 and 34' with their half fruits directly opposite coring stations 18 and 18', respectively, coring element 90 is rotated by means of a drive train that includes, for example, pinion gear 104 keyed to outer shaft 91, mating drive gear 106 attached to flexible drive shaft 108 journaled through bearing 109, and motor 110. Carriage 93 is then moved toward cup 34 by carriage actuator 94 until cutting bowl 96 is only slightly spaced from the exposed interior meat portion of fruit half F. A signal is then sent to actuator 112 to draw in inner shaft 94, which pulls cable 100 and rotates cutting bowl 96 slightly more than 90°. In this position and while rotating, cutting bowl 96 cleanly scoops a hemispherical piece of fruit meat from fruit half F. This fruit meat chunk and any released juice fall out of the peel and down onto trough 114 which directs the juice and meat to a collection station (not shown) to await further processing as will be hereinafter described.

As previously explained herein, cutting bowl 96 is sized to correspond to the particular group of fruits being processed. Preferably, cutting bowl 96 is just slightly smaller than the inner diameter of the peel of the smallest fruit to be processed to ensure that little or preferably no inner peel material is removed with the fruit meat. Therefore, in some instances, some fruit meat will remain attached to the fruit's peel after the above-described coring operation is complete. As further earlier explained herein, extracting the maximum amount of juice from a fruit is of critical importance; therefore, this remaining fruit meat and juice are preferably extracted from peel P in a reaming operation that is carried out at reaming stations 20 and 20'.

Figure 6A:
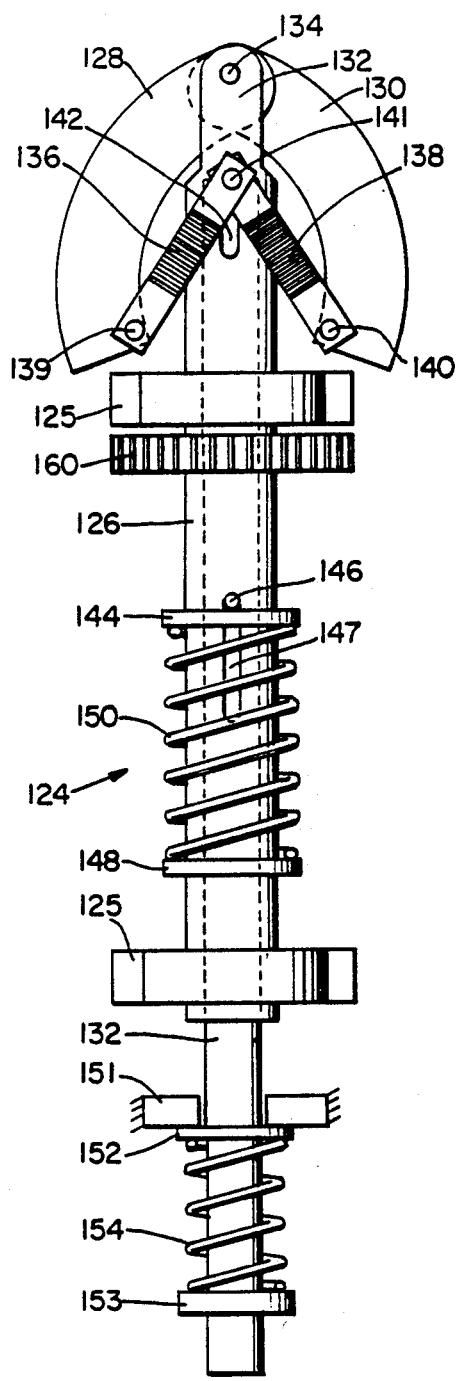
FIG. 6A is an enlarged schematic side view of the peel reaming element used in the reaming station of the extraction apparatus illustrated in FIG. 1, shown in its retracted position.
Figure 6B:
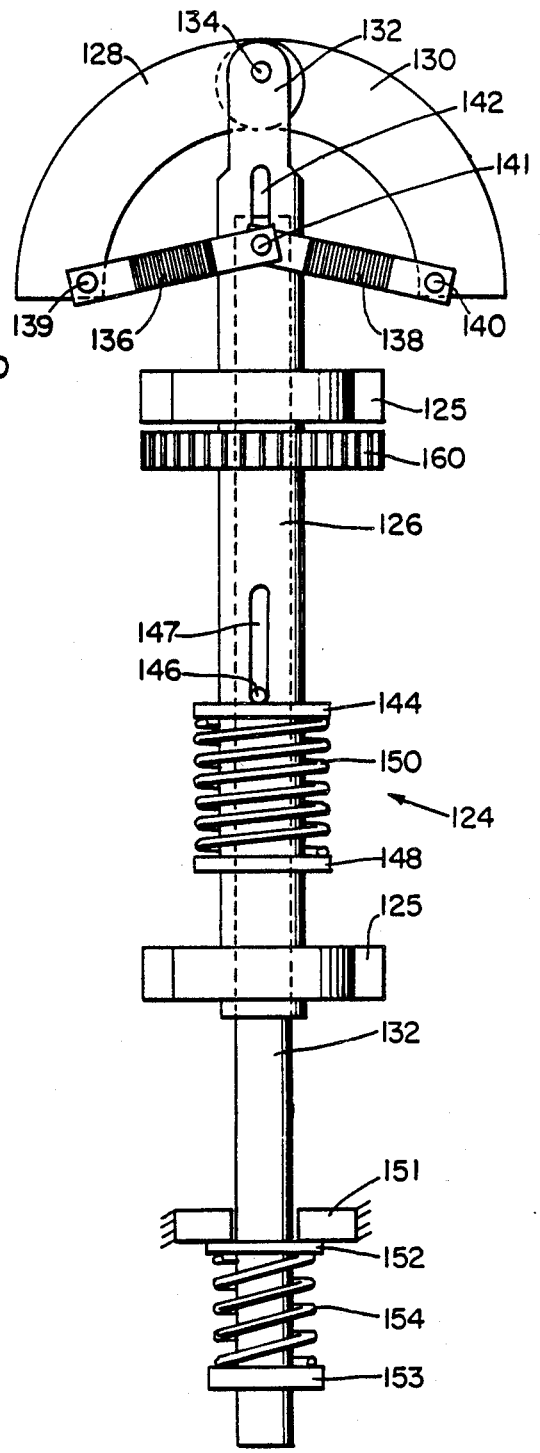
FIG. 6B is an enlarged schematic side view of the peel reaming element used in the reaming station of the extraction apparatus illustrated in FIG. 1, shown in its reaming position.

Referring to FIGS. 6A and 6B in conjunction with FIG. 1, turrets 14 and 14' are rotated 90° until cups 34 and 34' with their grasped peels P face directly opposed to reaming stations generally indicated as 20 and 20', respectively. Reaming station 20 includes a carriage assembly 120 that is movable toward and away from cup 34 by carriage actuator 122 as indicated by the double arrow. Reaming element 124, which is rotatably mounted to carriage assembly 120 with bearings 125, includes hollow outer shaft 126, expandable reaming blades 128 and 130, and inner shaft 132 that passes through hollow outer shaft 126. The leading front portions of reaming blades 128 and 130 are pivotally attached to outer shaft 126 at pin 134. The trailing rear portions of reaming blades 128 and 130 are pivotally attached to inner shaft 132 through Y-linkages 136 and 138 at pins 139 and 140, and pin 141 that passes through slot 142 cut in outer shaft 126. Reaming element 124 also includes a sliding collar 144 that is slidably mounted on outer shaft 126, fixed collar 148 that is attached to outer shaft 126, and a return spring 150 which surrounds outer shaft 126 and has its opposed ends butting up against sliding collar 144 and fixed collar 148. Pin 146 passes through slot 147 in outer shaft 126 and is attached to inner shaft 132. Stop 151, which is a Y-shaped yoke, is fixed to an adjustable point external to carriage assembly 120, i.e., stop 151 does not move with carriage 120. Finally, sliding collar 152 is slidably mounted on inner shaft 132, fixed collar 153 is rigidly attached to inner shaft 132, and spring 154 is positioned therebetween.

In operation, after turrets 14 and 14' have been indexed 90° such that cups 34 and 34' with peels P face directly opposed to reaming stations 20 and 20', reaming element 124 is rotated by means of, for example, motor 155, flexible drive shaft 156, drive gear 158, and mating pinion gear 160, which is fixedly attached, e.g., keyed, to outer shaft 126 of reaming element 124. At the same time, a signal is sent to carriage actuator 122 to move carriage assembly 120 a fixed distance toward cup 34. When the forward edge of reaming blades 128 and 130 begin to enter peel P, sliding collar 152 comes into contact with stop 151 and through spring 154 starts to hold fixed collar 153 from also moving forward. Since collar 153 is attached to inner shaft 132, inner shaft 132 is also held back relative to outer shaft 126, which pulls pin 141 down slot 142. In this fashion, Y-linkages 136 and 138 pivot outwardly around pin 141, which in turn causes reaming blades 128 and 130 to swing about pin 134 and expand outwardly and start reaming the fruit meat and juice remaining within peel P. As carriage assembly 120 continues to move toward cup 34, reaming blades 128 and 130 continue to expand outwardly until they come into contact with the inner surface of the peel, which resists the further expansion of reaming blades 128 and 130. If carriage assembly 120 has not yet reached its stopping point, springs 150 and 154 are compressed by the opposing force exerted from the peel. Therefore, the spring constants of springs 150 and 154 determine how much or how little reaming blades 128 and 130 will expand against the counteracting force applied by the peel. Preferably, springs 150 and 154 have spring constants such that reaming blades 128 and 130 only exert very slight pressure on the inner surface of peel P.

The scope of the present invention also contemplates the use of fluid jets to remove fruit meat and juice remaining within peel P instead of using expandable reaming element 124. As noted earlier herein, fluid jets have been met with little commercial success because in the case of a citrus fruit such as oranges, the inner sectional membranes (rag) tend to fold over and block the fluid's ability to reach meat deep within the peel. However, since the present invention's coring operation effectively removes a substantial amount of the fruit's meat and rag in the form of a hemispherical meat chunk, a fluid jet will work very well in scouring the remaining meat from the peel. Examples of fluid jet extractors that can be used include those as generally described in U.S. Pat. Nos. 4,294,861 and 4,300,448, which are incorporated herein by reference.

After the remaining fruit meat and juice have been removed 30 from peel P and collected at reaming stations 20 and 20', turrets 14 and 14' are again indexed 90° back to their starting positions to receive another fruit F at loading station 12 and begin another cycle. While traveling between the reaming and loading stations, cups 34 and 34' pass by knock off bars 166 and 166' (FIG. 1), respectively, which are positioned such that cups 34 and 34' will clear while the empty peels will not. Consequently, the peels strike bars 166 and are stripped from the cups. In addition, the vacuum supplied to the interior of cups 34 and 34' can be momentarily discontinued or replaced with pressurized air which makes it even easier for bars 166 and 166' to knock the peels from the cups.

Figure 7:
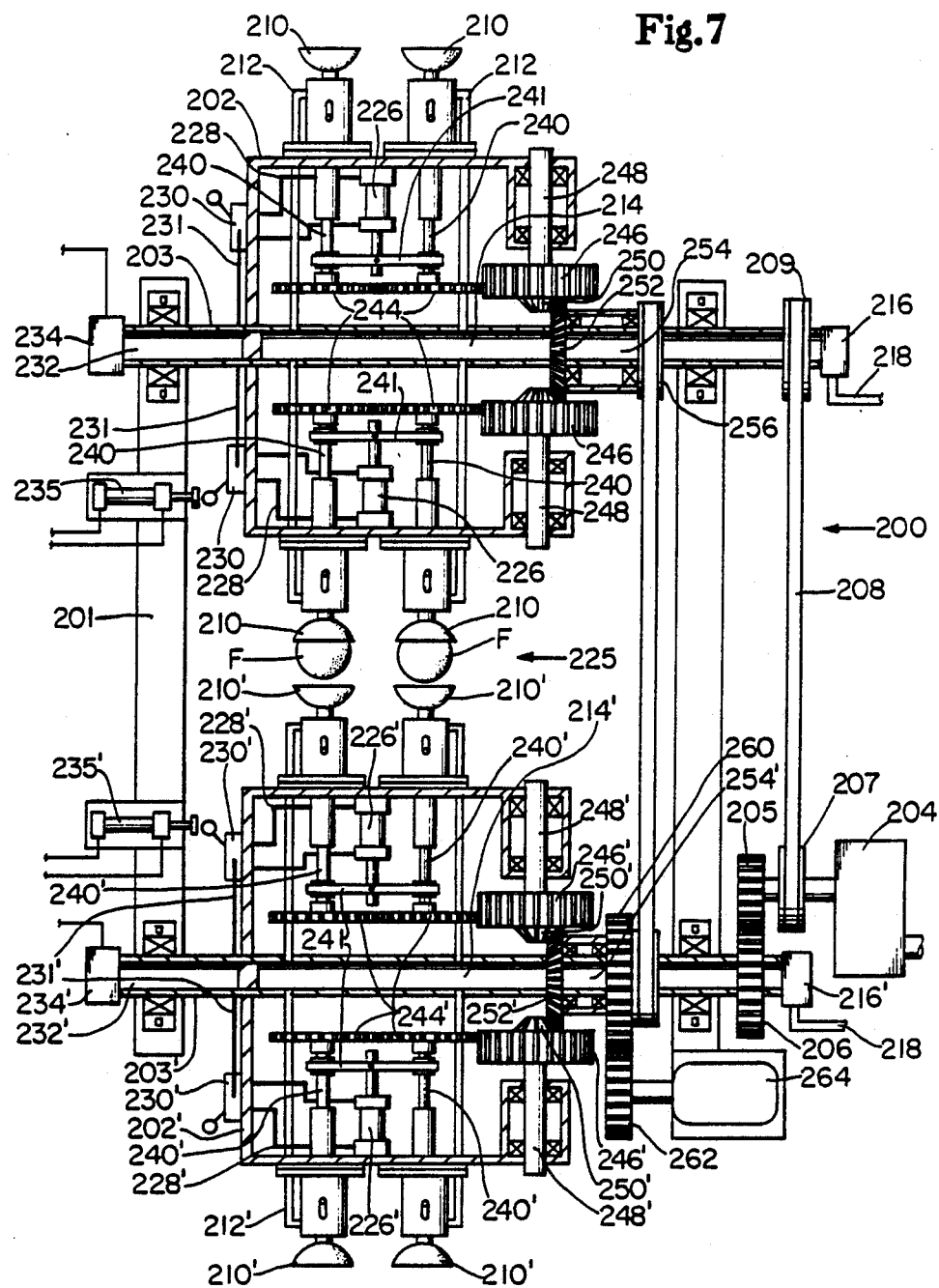
FIG. 7 is a schematic cross-sectional plan view of another particularly preferred extraction apparatus.
Figure 8A:
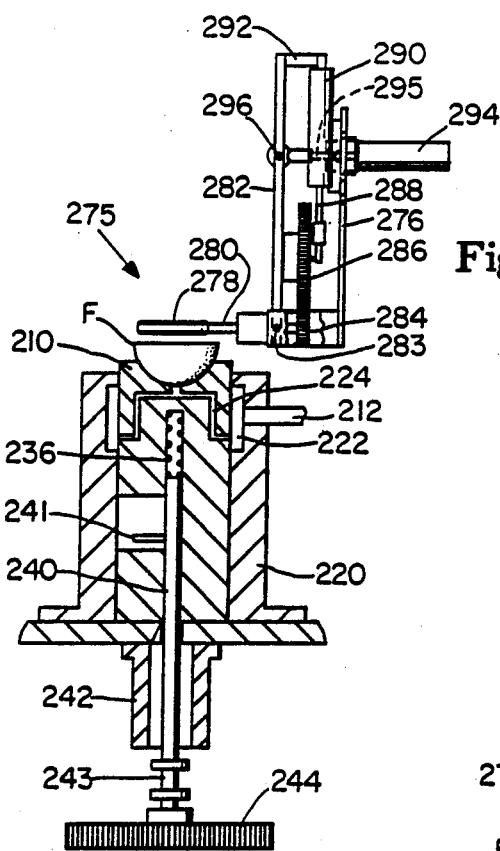
FIG. 8A is an enlarged, schematic, cross-sectional side view of the rotating cup and coring element of the extraction apparatus illustrated in FIG. 7, the coring element being shown in its retracted position.
Figure 8B:
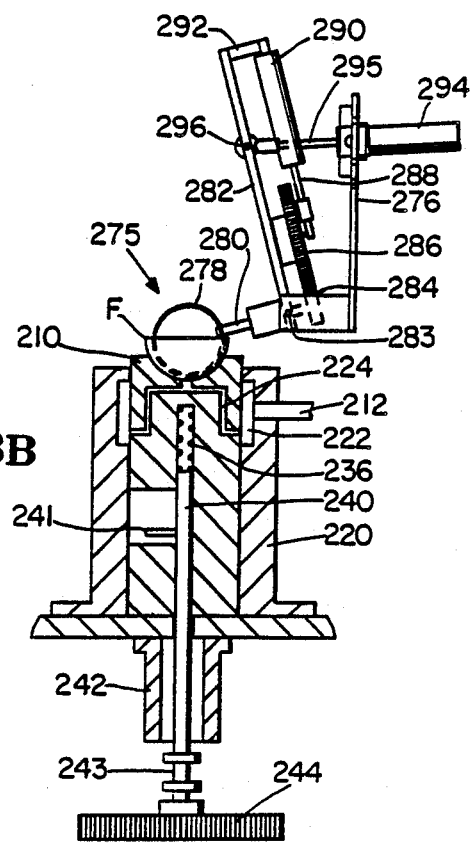
FIG. 8B is an enlarged, schematic, cross-sectional side view of the rotating cup and coring element of the extraction apparatus illustrated in FIG. 7, the coring element being shown in its coring position.

FIG. 7 along with FIGS. 8A and 8B illustrate another particularly preferred embodiment of an extraction apparatus generally indicated as 200 that is very similar to extraction apparatus 10 shown in FIGS. 1-6 except that apparatus 200 includes a different coring element and also includes continuously rotating cups rather than stationary cups. In addition, apparatus 200 uses dual cups to simultaneously process two fruits although as with apparatus 10, it can be expanded to include as many cups as space will permit.

In FIGS. 7 and 8A and 8B, extraction apparatus 200 generally includes frame 201, turret 202 mounted on hollow center shaft 203, and turret 202' mounted on hollow centershaft 203'. All the components of turret 202 are also found on turret 202' and are indicated with a "'". Accordingly, the description of turret 202 is equally applicable to turret 202' and therefore is omitted.

Turret 202 includes resilient fruit-holding cups 210 that are indexed through the four stations (loading, cutting, coring, and reaming) by a drive train that includes, for example, indexing motor 204, drive gear 205 and pinion gear 206 to index turret 202', and pulley 207, gearbelt 208, and pulley 209 to index turret 202.

Fruits F are fed into extraction apparatus 200 at a loading station that includes a loader having the same features as loader 13 that was earlier described and illustrated herein in connection with apparatus 10. Accordingly, a detailed description is believed to be unnecessary and therefore omitted.

Like cups 34 of earlier-described apparatus 10, resilient cups 210 of apparatus 200 hold fruit F during the extraction cycle with preferably the aid of vacuum. In apparatus 200, cups 210 are supplied with vacuum via vacuum line 212, vacuum side 214 of hollow centershaft 203, vacuum rotary manifold 216, and vacuum line 218 connected to a constant source of vacuum (not shown). In FIG. 8A, which shows rotating cup 210 in enlarged detail, vacuum line 212 enters vacuum manifold block 220 having manifold 222, which continuously supplies the interior of rotating cup 210 with vacuum via passageway 224.

At the cutting station located between turrets 202 and 202' and generally indicated as 225, cup 210 holding fruit F and cup 210' are moved toward one another to firmly grasp fruit F therebetween by energizing actuators 226 and 226', respectively, which are connected to shafts 240 and 24D' at yokes 243 and 243' via bars 241 and 241', respectively. Actuator 226 is supplied with compressed air via line 228, switch 230, air line 231, compressed air side 232 of hollow centershaft 203, and compressed air rotary manifold 234, which is in fluid communication with a source (not shown) of compressed air. Actuators 226 and 226' are energized by sending a signal to switch actuators 235 and 235' which mechanically trip switches 230 and 230', respectively. Cups 210 and 210' are backed by matched centering springs 236 and 236 (FIG. 8A), respectively, which are part of a centering mechanism that operates in the same fashion as the one described earlier herein to center fruit F relative to the cutting blade regardless of small size variations in the fruits to be processed.

Referring to both FIGS. 7 and 8A, cups 210 and 210' are preferably continuously rotated to make the coring and reaming operations quicker and more efficient. Cups 210 are attached to shaft 240 with sliding drive pin 241. Shaft 240 is journaled within rotary/linear bearing 242. Pinion gear 244 is attached to the end of shaft 240 and is driven by drive gear 246 which is mounted to idler shaft 248. The face of drive gear 246 is wide enough to accommodate the forward and return motion of pinion gears 244 when cups 210 are moved toward and away from one another at the cutting station. Drive gear 246 is driven by a drive train that includes, for example, bevel gears 250 mounted on idler shaft 248 that mates with bevel gear 252 mounted on shaft 254. Pulley 256 is mounted on the other end of shaft 254 and is rotated by drivebelt 257 and pulley 258 which is mounted on shaft 254'. Shaft 254' is rotated by attached pinion gear 260, drive gear 262, and cup drive motor 264. The rotation of shaft 254' drives a similar series of drive components all designated by "'" to continuously rotate cups 210'.

Referring now to FIGS. 8A and 8B, the coring station of the present apparatus includes a coring element generally indicated as 275 having a frame 276 that is attached to a point on frame 201 directly opposed to where rotating vacuum cups 210 stops at the coring station. Coring element 275 uses a rotatable, ring-shaped coring blade 278 to cut a hemispherical chunk of fruit meat from half fruit F. Coring blade 278 is mounted on one end of shaft 280 that is journaled through pivot bar 282, which is pivotally attached to frame 276 at hinge pin 283. Pinion gear 284 is attached to the other end of shaft 280 and mates with drive gear 286, which preferably is much larger than pinion gear 284. Rod 288 is pivotally attached to drive gear 286 near its outer periphery. The other end of rod 288 is connected to actuator 290 which is anchored to pivot bar 282 via member 292.

In order to allow cup 210 to clear coring blade 278 when turret 202 is indexed, coring blade 278 is preferably movable from a retracted position as shown in FIG. 8A to a coring position as shown in FIG. 8B. This motion can be accomplished by using, for example, actuator 294 that is attached to frame 276. Shaft 295 of actuator 294 is attached to pivot bar 282 at pin/bearing connection 296.

In operation, after turret 202 has been indexed such that rotating vacuum cup 210 holding half fruit F is directly opposed to coring element 275, actuator 294 is energized, which extends shaft 295 outward and swings pivot bar 282 outwardly around hinge pin 283. Coring blade 278 swings downwardly around hinge pin 283 and cuts into the inner meat portion of half fruit F. At this point, actuator 290 is energized and extends shaft 288, which causes drive gear 286 and mating pinion gear 284 to rotate coring blade 278 as shown in FIG. 8B. Preferably, gears 284 and 286 have a ratio such that coring blade 278 will rotate approximately 90°. This rotation of coring blade 278 coupled with the continuous rotation of cup 210 and half fruit F cleanly severs a hemispherical chunk of fruit meat from half fruit F. When severed from the peel, this meat chunk tumbles from the peel and is collected along with any released juice for further processing.

As with coring bowl 96 of extraction apparatus 10 described earlier herein, ring-shaped coring blade 278 of apparatus 200 is preferably sized such that it is just slightly smaller than the inner diameter of the peel of the smallest fruit to be processed. Of course, this will result in some meat remaining on the inner surface of the peel. This meat and associated juice are preferably extracted at a reaming station that is basically identical to reaming station 20 of apparatus 10, the only different being that it is not necessary to rotate the reaming element since apparatus 200 uses continuously rotating cups that rotate the fruit. Alternatively and as is the case with earlier described apparatus 10, apparatus 200 can utilize a fluid jet at its reaming station to extract any fruit meat remaining within peep P.

The extracted and collected fruit meat chunks and juice obtained by utilizing one of the earlier-described extraction apparatuses may now be packaged for human consumption or further refined by, for example, using a common finisher such as the FMC UCF-200 Universal Citrus Finisher, which is available from the Citrus Machinery Division of the FMC Corporation, Fairway Avenue, Lakeland, Fla. 33802. U.S.A. With such a finisher, unfinished juice is introduced into the finisher through an intake opening at one end. The product is conveyed by a finisher screw through a cylindrical screen. The finisher screw forces the juice through the screen to a liquid outlet and delivers uniformly dry pomace to the discharge outlet. However, as explained earlier, this general type of finisher handles fruit meat very roughly and destroys virtually all of the juice sacs as well as shreds the rag, core, and seeds, thereby releasing the undesirable flavor components found in each that contaminate the juice. Therefore, it is preferred that the collected fruit meat chunks extracted from fruits by using apparatus 10 or 200 be further processed by the rag separator illustrated in FIG. 9, and the seed separator 400 illustrated in FIGS. 10 and 11.

In FIGS. 9A and 9B, rag/seed separator generally indicated as 300 includes tubular screen member 302 having an open discharge end 304 and a plate 306 closing the opposed input end 307. Race 312, which is attached to open discharge end 304, and race 314, which is attached to plate 306 at input end 307, are supported by a plurality of bearings 316 that allow screen member 302 to freely rotate. Screen member 302 can be rotated by, for example, a drive train that includes sprocket 315 attached to race 312 and connected with a chain to a drive sprocket and motor (not shown). Screen member 302 is preferably inclined with respect to the horizontal plane and slopes from input end 307 down to discharge end 304.

Shaft 320 passes coaxially through screen member 302 and is journaled through bearings in support frame 322. Shaft 320 is rotatable by a drive train that includes, for example, sprocket 329 mounted in shaft 320, and a chain, drive sprocket, and motor (not shown).

A plurality of striker bars 324 are attached to and project radially from a plurality of corresponding collars 326 that are mounted on shaft 320. Preferably, collars 326 are slidably mounted on shaft 320 so that the distance between adjacent striker bars and their orientation with respect to one another can be adjusted. Preferably, two striker bards 324 project from each collar 326. Two sweep blades 327 and 328 are also adjustably attached to shaft 320 near discharge end 304 of screen 302.

Plate 306 closing the input end of screen member 302 includes opening 330 having feed conduit 331 in fluid communication therewith to provide a means for introducing chunks of fruit meat into the interior of screen member 302. Baffle 332 is attached to plate 306 and spaced a distance from opening 307 sufficient to allow fruit meat chunks to pass therebetween.

A down and inwardly-sloped collection trough 340 is located directly under screen member 302 and is divided by wall 342 into juice/juice sac collecting section 344 and rag/seed collecting section 346. Slop 348 in juice/juice sac collecting section 344 and output conduit 350 lead to a large collection vessel (not shown) where juice and juice sacs are collected for further processing.

In operation, large chunks of fruit meat extracted from fruits by using, for example, earlier-described extraction apparatus 10 or 200 are fed into the interior of rotating screen member 302 via input conduit 331 and opening 330 in plate 306. The chunks strike baffle 332 and fall onto the inner surface of screen 302, which is preferably rotated at a speed slow enough to allow the chunks to freely tumble within screen member 302. At the same time, shaft 320 with attached striker bards 324 is also rotated, preferably in the direction opposite to that which screen 302 is rotating. As the fruit chunks tumble and move down through screen 302 toward discharge end 304, they collide with rotating bars 324. The bars striking the meat chunks combined with centrifugal force gently separate the juice sacs from the rag and also from one another. The separated juice sacs and juice from the portion of sacs that are ruptured pass radially through screen 302 and are caught and directed by a hinged shroud 352 (shown open) that encloses screen 302 to collection trough 340 and out through slot 348 to juice/juice sac slurry discharge conduit 350. The incline of screen 302 causes the rags and large seeds to tumble axially downward toward discharge end 304. In a particularly preferred embodiment, striker bars 324 are arranged in a spiral around rotating shaft to aid in moving the rags toward discharge end 304. When the rags reach sweep blades 327 and 328, the blades quickly sweep the rags axially out of screen 302 and into rag/seed collecting section 346.

EXAMPLE

Screen 302 was made of 1/16" (0.16 cm) nylon-coated, food grade stainless steel having land areas ⅛" (0.32 cm) wide and openings ⅜" (0.95 cm) square. The screen was approximately 42 inches (106.7 cm) long and 12 inches (30.5 cm) in diameter. The screen could be adjustably angled between 2° and 15° with respect to the horizontal with best results obtained at a 3°–4° inclination.

Shaft 320 was 2 inches (5.1 cm) in diameter and carried fifty-two 3.0 inch (7.6 cm) diameter collars spaced over 32 inches (81.3 cm) of the shaft. Each collar had 2 striker bars for a total of 104 striker bars, each bar being 4½ inches (10.8 cm) long and 3/16 inches (0.48 cm) in diameter.

Best results in separating whole juice sacs from rags were obtained when the ratio of screen rotation speed to striker bar rotation speed was maintained at from 0.6:1 and 3:1. The striker bar was rotated at between 50 and 400 r.p.m. with best results dependent on the type, age, temperature, etc. of the fruit meat chunk being processed.

Figure 11:
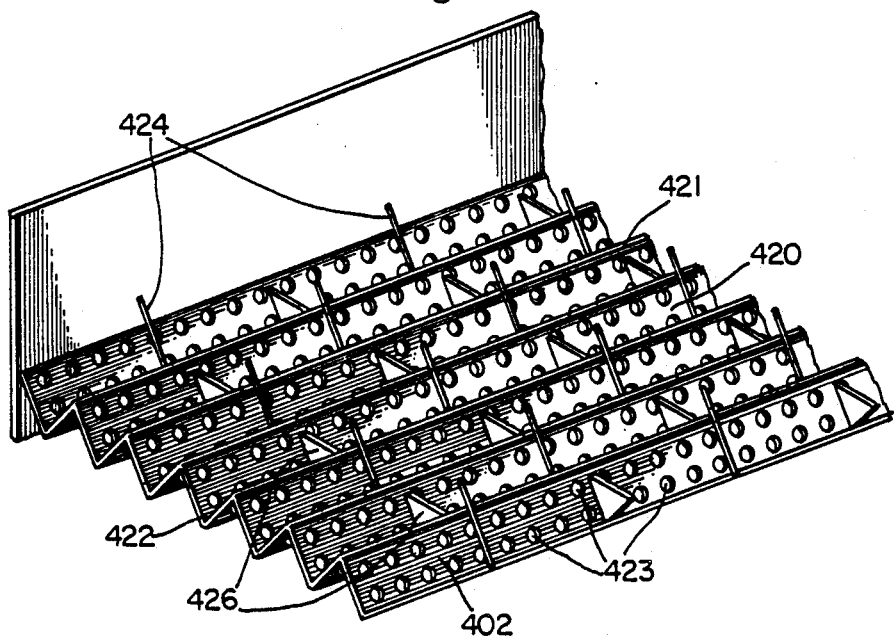
FIG. 11 is an enlarged schematic perspective view of a portion of the bed of the seed separating apparatus illustrated in FIG. 10.

The juice/juice sac slurry obtained from rag separator 300 will contain some seeds that pass radially through screen 302. Referring to FIGS. 10 and 11, the apparatus generally indicated as 400 relies on high frequency vibration and the differences in bouncing characteristics between seeds and juice sacs to separate the two. Of particular significance is that seed separator apparatus 400 does not cut or smash seeds and therefore the seeds do not release undesirable flavor elements.

In FIG. 10, the apparatus generally indicated as 400 includes an upwardly-inclined bed generally indicated as 401 that is preferably separated into upper bed section 402 and lower bed section 404, and a large vibrating base 406. Base 406 is a commercially available component that is used in the vibrating screen industry, for example, Model SELECTRO 245-20-HBAS available from SMICO MANUFACTURING of Oklahoma City, Okla., U.S.A. Briefly, base 406 uses an eccentric ring and counterweights driven by a motor, sprockets, and chain as shown to simultaneously impart vertical and horizontal motion to the bed to separate materials. The bed can be operated at speeds from between about 1000 and 1600 cycles/min. with eight different stroke settings ranging from between 0 and ⅜ inches (0.95 cm).

Referring to FIGS. 10 and 11, upper bed 402 and lower bed 404 include screen member 420 having a plurality of ridges 421 and valleys 422 that define separate channels extending the length of screen member 420. Screen member 420 is provided with a plurality of apertures 423 therein that are preferably ⅛ inch (0.32 cm) in diameter. A plurality of pins 424 and dams 426 are attached to the upper surface of screen 420 and project upwardly therefrom.

Apparatus 400 also includes an inlet port 430 through which the juice sac/juice slurry output from rag separator apparatus 300 is fed onto the top surface of upper bed section 402. Apparatus 400 further includes seed discharge port 432 through which the seeds separated from the juice sacs/juice slurry exit and are collected, and discharge opening 434 through which juice flows and is collected.

In operation, the output juice sac/juice slurry from rag separator apparatus 300 is fed into seed separator apparatus 400 through inlet port 430. Preferably, the juice sac/juice slurry is evenly distributed onto the upper surface of upper bed section 402 of bed 401. The vibrating motion, i.e., high-speed horizontal and vertical movement, imparted to upper bed section 402 by base 406 causes the juice sacs to travel up inclined upper bed section 402 while the seeds bounce high into the air. The bouncing seeds tumble down upper bed 402 and are discharged from apparatus 400 through seed discharge port 432. Ridges 421 and valleys 422 evenly channel the juice sacs up bed 401 and prevent the sacs from bunching up on either side of bed 401.

As the juice sac/slurry travels up upper bed section 402, any juice released from ruptured sacs passes through apertures 423 in screen 420 and runs down a trough (not shown) located below bed 401, then through discharge opening 434 and into a large collection container (also not shown). As the juice sacs further travel up upper bed section 402, pins 424 and dams 426 gently break apart any clusters of juice sacs to free any seeds that might be trapped therein. When the juice sacs reach the top of upper bed section 402, they drop off the edge and fall down onto lower bed section 404. This waterfall tumbling or cascading action of the sacs as they pass from upper bed section 402 to lower bed section 404 further aids in breaking up any juice sac clumps to free any seeds therein. Indeed, the present invention contemplates using three or more bed sections terraced in this fashion to insure the complete freeing and removal of seeds from the juice sacs.

The juice sacs travel up lower vibrating bed section 404 while any remaining seeds bounce free and tumble down lower bed section 404. When the juice sacs now substantially free of seeds reach the upper end of lower bed section 404, they fall off the last edge where they are collected in a large container. These juice sacs can then be used in preparing a fruit food or added to fruit juice.

While several particularly preferred embodiments of the present invention have been described and illustrated, it should now be apparent to those skilled in the art that various changes and modifications can be made without departing from the spirit and scope of the invention. In addition, although the proceeding description of the present invention is generally addressed to extracting fruit meat and juice from citrus fruits, the invention can also be applied with equal facility to a wide variety of fruits and vegetables in general. Accordingly, the following claims are intended to embrace such changes, modifications, and areas of application that are within the spirit and scope of this invention.

What is claimed is:

1. A method of separating seeds, juice and juice sacs from a juice/juice sac slurry containing said seeds, said method comprising the steps of:
   (a) depositing said juice/juice sac slurry onto the upper surface of an inclined bed having a plurality of apertures therethrough;
   (b) vibrating said inclined bed, whereby said juice sacs deposited onto said upper surface of said bed travel up said bed and off its upper end while said seeds bounce down and off said bed, thereby separating said seeds from said juice sacs; and
   (c) passing said juice through said apertures in said bed and collecting said juice therebelow.

2. An apparatus for separating seeds from a juice/juice sac slurry containing seeds, said apparatus comprising:
   (a) a base;
   (b) an inclined rigid bed attached to said base by means for enabling said bed to be vibrated horizontally and vertically, said bed having an upper end, a lower end, and an upper surface defined by a plurality of ridges and valleys which, in turn, define a plurality of longitudinally extending channels, said channels having V-shaped transverse sections;
   (c) means for depositing said juice/juice sac slurry containing seeds onto said upper surface of said bed;
   (d) means for vibrating said bed horizontally and vertically so that said juice sacs deposited onto said upper surface of said bed travel up said bed and off said upper end and said seeds bounce and tumble down and off said bed thereby separating said seeds from said juice/juice sac slurry; and
   (e) a plurality of pins projecting upwardly from bottom regions of said channels whereby said pins function to gently break apart clusters of juice sacs while said sacs travel up said bed.

3. An apparatus for separating seeds from a juice/juice sac slurry containing seeds, said apparatus comprising:
   (a) a base;
   (b) an inclined rigid bed attached to said base by means for enabling said bed to be vibrated horizontally and vertically, said bed having an upper end, a lower end, and an upper surface defined by a plurality of ridges and valleys which, in turn, define a plurality of longitudinally extending channels, said channels having V-shaped transverse sections;
   (c) means for depositing said juice/juice sac slurry containing seeds onto said upper surface of said bed;

(d) means for vibrating said bed horizontally and vertically so that said juice sacs deposited onto said upper surface of said bed travel up said bed and off said upper end and said seeds bounce and tumble down and off said bed thereby separating said seeds from said juice/juice sac slurry; and (e) a plurality of dams projecting upwardly from bottom regions of said channels whereby said dams function to gently break apart clusters of juice sacs while said sacs travel up said bed.

4. An apparatus for separating seeds from a juice/juice sac slurry containing seeds, said apparatus comprising:

(a) a base;

(b) an inclined bed attached to said base, said bed having an upper surface;

(c) means for depositing said juice/juice sac slurry containing seeds onto said upper surface of said bed;

(d) means for vibrating said bed, whereby said juice sacs deposited onto said upper surface of said bed travel up said bed while said seeds bounce and tumble down said bed, thereby separating said seeds from said juice/juice sac slurry; and (e) a plurality of apertures in said inclined bed, whereby juice passes through said bed.

5. The apparatus recited in claim 2 further comprising: a plurality of apertures in said inclined bed, whereby juice passes through said bed.

6. The apparatus recited in claim 5 further comprising: juice collection means disposed below said apertured bed.

7. The apparatus recited in claim 3 further comprising: a plurality of apertures in said inclined bed, whereby juice passes through said bed.

8. The apparatus recited in claim 4 further comprising:

(i) a juice collection trough located below said apertured bed.

9. The apparatus recited in claim 2, 3 or 4 wherein said bed comprises a plurality of terraced, shingled, upwardly inclined bed sections, each of said bed sections having a top end and a bottom end, and said bed sections being disposed so that the top ends of said sections are superposed the lower ends of adjacent said sections, said means for vibrating said bed comprising means for vibration said bed sections so that said seeds bounce and tumble off their bottom ends into seed collection means, and so that said juice sacs progressively move upward on said bed sections and fall off the top end of the last bed section.

10. The apparatus recited in claim 5 or 7 wherein said bed is vibrated at from about 1000 to about 1600 cycles/min.

11. The apparatus recited in claim 5 or 7 wherein said bed is vibrated at an amplitude of from about 1/32 inch (0.08 cm) to about ⅜ inch (0.95 cm).

* * * * *

UNITED STATES PATENT AND TRADEMARK OFFICE
CERTIFICATE OF CORRECTION

PATENT NO. : 4,981,220

DATED : Jan. 1, 1991

INVENTOR(S) : Michael S. Kolodesh; Walter Cash, Jr.

It is certified that error appears in the above-identified patent and that said Letters Patent is hereby corrected as shown below:

(1) Column 2, line 39, after "the" insert -- inner meat. In addition, peeling techniques typically require a -- .

(2) Column 11, line 44, "24D'" should read -- 240' -- .

(3) Column 12, line 64, "different" should read -- difference -- .

(4) Column 13, line 2, "peep" should read -- peel -- .

(5) Column 13, line 44, "in" should read -- on -- .

(6) Column 13, line 52, "bards" should read -- bars -- .

(7) Column 13, line 66, "Slop" should read -- Slot -- .

(8) Column 14, line 11, "bards" should read -- bars -- .

(9) Column 15, line 2, "245-20-HBAS" should read -- 245-2D-HBAS -- .

(10) Column 16, line 6, "proceeding" should read -- preceding -- .

(11) Column 18, line 9, delete "(i)".

(12) Column 18, line 18, "vibration" should read -- vibrating -- .

Signed and Sealed this

Thirtieth Day of June, 1992

*Attest:*

DOUGLAS B. COMER

*Attesting Officer*  *Acting Commissioner of Patents and Trademarks*